United States Patent [19]

Fukuda et al.

[11] Patent Number: 4,487,904
[45] Date of Patent: Dec. 11, 1984

[54] URETHANIZED ACRYLIC RESIN MATERIAL FOR PLASTIC LENS AND LENS COMPOSED THEREOF

[75] Inventors: Tadanori Fukuda, Otsu; Sadayuki Sakamoto, Shiga, both of Japan

[73] Assignee: Toray Industries, Inc., Tokyo, Japan

[21] Appl. No.: 534,197

[22] Filed: Sep. 21, 1983

[51] Int. Cl.³ .................... C08F 26/02; C08F 126/02; C08F 226/02
[52] U.S. Cl. .................................................. 526/301
[58] Field of Search ........................ 526/301; 523/106; 528/205, 206, 210

[56] References Cited

U.S. PATENT DOCUMENTS

| | | | |
|---|---|---|---|
| 3,786,034 | 1/1974 | Blair et al. | 523/106 |
| 4,098,918 | 7/1978 | De Majistre | 526/301 |
| 4,347,174 | 8/1982 | Nagase et al. | 526/301 |

Primary Examiner—Joseph L. Schofer
Assistant Examiner—Peter F. Kulkosky
Attorney, Agent, or Firm—Austin R. Miller

[57] ABSTRACT

A polymer obtained by polymerizing a urethanized acrylic or methacrylic monomer obtained by reacting the hydroxyl group of an acrylic or methacrylic monomer having a nucleus-halogen-substituted aromatic ring and a hydroxyl group with the isocyanate group of a polyfunctional isocyanate is excellent and has a high refractive index. Accordingly, this polymer is valuable as a resin material for a plastic lens.

7 Claims, No Drawings

URETHANIZED ACRYLIC RESIN MATERIAL FOR PLASTIC LENS AND LENS COMPOSED THEREOF

BACKGROUND OF THE INVENTION (1) Field of the Invention

This invention relates to a resin material for a plastic lens and also to a lens composed thereof.

(2) Description of the Prior Art

A plastic lens is advantageous over a glass lens in that the plastic lens is easier to make, and when it is used as a spectacle lens, a high safety is assured because it is light in weight and has a good impact resistance.

An acrylic resin, a polycarbonate resin, an allyl diglycolcarbonate resin, a polystyrene resin and the like have heretofore been used as a resin material for a plastic lens. Among these resins, diethylene glycol bisallylcarbonate, which is a thermosetting resin, is widely used as a plastic lens for a sight-accomodating spectacle. This resin has various advantageous characteristics. For example, the impact resistance is excellent, the degree of the spectacle is not greatly varied depending upon the change of the temperature, and the resin is excellent in the cutting property and processability.

However, the refractive index of diethylene glycol bisallylcarbonate is 1.50 and a plastic lens made of this resin has a large thickness on the peripheral edge portion thereof than that of a glass lens. This defect is prominent as the degree of the lens is increased.

Various resins for plastic lenses have recently been proposed as resin materials free of the above-mentioned defect. For example, British Pat. No. 2,034,721 teaches that a copolymer of a dimethacrylate having a bisphenol group with chlorostyrene has a refractive index of 1.591. Furthermore, Japanese Unexamined Patent Publication (KOKAI) No. 166214/81 teaches that a copolymer of a dimethacrylate having a tetrabromobisphenol group with chlorostyrene has a refractive index of 1.603. Although these resins have a considerably high refractive index, they possess poor toughness and impact resistance.

As means for imparting a good toughness and an appropriately high refractive index, there is known a method comprising mixing or copolymerizing the resin with polyurethane. For example, U.S. Pat. No. 4,360,653 teaches that a copolymer of polyol(allylcarbonate) with polyurethane having a terminal acrylate functionality is excellent in strength, impact resistance and optical clarity, and Laid-Open EPC Application No. 59,561A teaches that a reaction product of hydroxymethacrylate and xylene diisocyanate has a refractive index of at least 1.55. However, these resins do not have a high refractive index sufficient to provide a sight-accommodating lens.

SUMMARY OF THE INVENTION

It is a primary object of the present invention to provide a resin material for a plastic lens, which has a refractive index of at least 1.58, preferably at least 1.60, and is excellent in toughness.

Another object of the present invention is to provide a tough plastic lens having a high refractive index.

In accordance with the present invention, there are provided a resin material for a plastic lens, which is composed of a polymer obtained by polymerizing a urethanized acrylic or methacrylic monomer formed by reacting an acrylic or methacrylic monomer having a nucleus-halogen-substituted aromatic ring and a hydroxyl group with a polyfunctional isocyanate; and a plastic lens composed of said resin material.

A polymer obtained by copolymerizing the above-mentioned urethanized acrylic or methacrylic monomer with another vinyl monomer having an aromatic ring can also be used advantageously. This other vinyl monomer having an aromatic ring in the molecule may be used in an amount of up to 70% by weight based on the total weight of the monomers.

DETAILED DESCRIPTION OF THE INVENTION

In the present invention, by the term "lens" is meant a plate-like article, at least one surface of which is a surface having a curvature.

As the acrylic or methacrylic monomer having a nucleus-halogen-substituted aromatic ring and a hydroxyl group in the molecule (hereinafter referred to as "monomer (a)" for brevity), compounds represented by the following formulae (I), (II) and (III) are preferably used in the present invention:

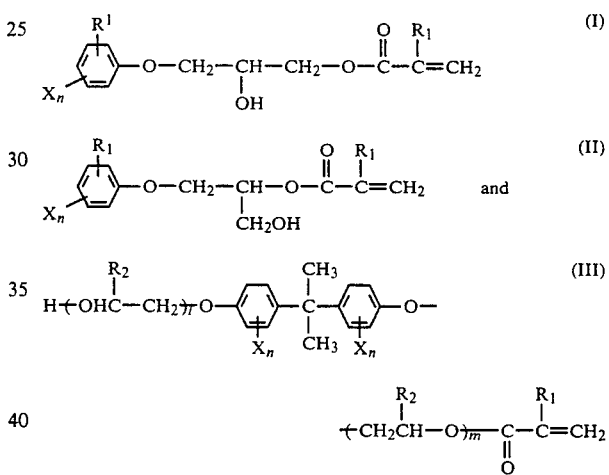

wherein X is chlorine, bromine or iodine, each of $R_1$ and $R_2$ is a methyl group or hydrogen, n is an integer of from 1 to 4, and l and m are integers of from 0 to 4 with the proviso that the sum of l and m is an integer of from 0 to 4.

As specific examples of the compounds of the formulae (I) and (II), there can be mentioned 3-(2,4-dibromophenoxy)-2-hydroxypropyl acrylate, 2-(2,4-dibromophenoxy-1-hydroxymethyl)ethyl acrylate, 3-(2,4,6-tribromophenoxy)-2-hydroxypropyl acrylate, 2-(2,4,6-tribromophenoxy)-1-hydroxymethylethyl acrylate, 3-(2,4-dibromophenoxy)-2-hydroxypropyl methacrylate, 3-(2,4,6-tribromophenyoxy)-2-hydroxypropyl methacrylate, 3-(2,4-iodophenoxy)-2-hydroxypropyl acrylate and 3-(2,4,6-triiodophenoxy)-2-hydroxypropyl acrylate. Among the foregoing compounds, 3-(2,4,6-tribromophenyoxy)-2-hydroxypropyl acrylate, 3-(2,4-dibromophenoxy)-2-hydroxypropyl acrylate and 3-(2,4-iodophenoxy)-2-hydroxypropyl acrylate are preferred.

Other specific examples of the compunds of the formulae (I) and (II), there can be mentioned 3-(2,4,6-tribromo-3-methylphenoxy)-2-hydroxypropyl acrylate, 2-(2,4,6-tribromo-3-methylphenoxy-1-hydroxymethyl)ethyl acrylate, 3-(2,4-dibromo-3-methylphenoxy)-2-hydroxypropyl acrylate, 3-(2,6-diiodo-3-methylphenoxy)-2-hydroxypropyl acrylate, 3-(2,4,6-tribromo-3-methylphenoxy)-2-hydroxypropyl methacrylate. 3-(3-methyl-5-bromophenoxy)-2-hydroxypropyl acrylate and 3-(3-methyl-5-iodophenoxy)-2-hydroxypropyl methacrylate. Among the foregoing compounds, 3-(2,4,6-tribromo-3-methylphenoxy)-2-hydroxypropyl acrylate, 3-(2,4-dibromo-3-methylphenoxy)-2-hydroxypropyl acrylate, 3-(3-methyl-5-bromophenoxy)-2-hydroxypropyl acrylate and mixtures thereof are preferred.

As specific examples of the compound of the formula (III), there can be mentioned 2-(4-hydroxyethoxy-3,5-dibromophenyl)-2-(4-acryloxyethoxy-3,5-dibromophenyl)propane, 2-(4-hydroxyethoxy-3,5-dibromophenyl)-2-(4-methacryloxyethoxy-3,5-dibromophenyl) propane, 2-(4-hydroxyethoxy-3,5-dibromophenyl)-2-(4-acryloxy-3,5-dibromophenyl)propane, 2-(4-hydroxyethoxy-3,5-dibromophenyl)-2-(4-methacryloxy-3,5-dibromophenyl)propane, 2-(4-hydroxy-3,5-dibromophenyl)-2-(4-acryloxy-3,5-dibromophenyl)propane, 2-(4-hydroxy-3,5-dibromophenyl)-2-(4-methacryloxy-3,5-dibromophenyl) propane, 2-(4-hydroxydiethoxy-3,5-dibromophenyl)-2-(4-methacryloxy-3,5-dibromophenyl) propane, 2-(4-hydroxydiethoxy-3,5-dibromophenyl)-2-(4-acryloxydi ethoxy-3,5-dibromophenyl)propane and 2-(4-hydroxydiethoxy-3,5-dibromophenyl)-2-(4-methacryloxydiethoxy-3,5-dibromophenyl) propane. Among the foregoing compounds, 2-(4-hydroxyethoxy-3,5-dibromophenyl)-2-(4-acryloxyethoxy-3,5-dibromophenyl)propane, 2-(4-hydroxydiethoxy-3,5-dibromophenyl)-2-(4-methacryloxydiethoxy-3,5-dibromophenyl)propane and mixtures thereof are preferred.

The above-mentioned compounds may be used alone or in the form of a mixture of two or more of them.

As the polyfunctional isocyanate (hereinafter referred to as "isocyanate (b)" for brevity), there can be mentioned diisocyanates such as hexamethylene diisocyanate, isophorone diisocyanate, 2,2,4-trimethyl hexamethylene diisocyanate, dicyclohexylmethane diisocyanate, lysine diisocyanate methyl ester, xylylene diisocyanate, bis(isocyanatomethyl)cyclohexane, tolylene diisocyanate and 4,4'-diphenylmethane diisocyanate, and polyfunctional isocyanates having a functionality of 3 or more, such as a biuret reaction product of hexamethylene diisocyanate, an adduct of hexamethylene diisocyanate to trimethylolpropane, 2-isocyanatoethyl-2,6-diisocyanatohexanoate, 1,6,11-undecane triisocyanate, an adduct to isophorone diisocyanate to trimethylolpropane, an adduct of xylylene diisocyanate to trimethylolpropane and an adduct of bis(isocyanatomethyl) cylcohexane to trimethylolpropane.

Among the foregoing isocyanate compounds, xylylene diisocyanate, isophorone diisocyanate and bis(isocyanatomethyl) cyclohexane are preferred.

The molar ratio between the acrylic or methacrylic monomer (a) and the polyfunctional isocyanate (b) is such that the NCO/OH molar ratio is in the range of from 0.5 to 2.0, preferably from 0.8 to 1.0. If the NCO/OH molar ratio is lower than 0.5, the impact strength is reduced, and furthermore, the flexural strength, heat softening property and cutting or grinding property are degraded. If the NCO/OH molar ratio exceeds 2.0, the polymer is readily discolored.

When the acrylic or methacrylic monomer (a) is reacted with the polyfunctional isocyanate (b), the hydroxyl group of the acrylic or methacrylic monomer (a) is reacted with the isocyanate group of the polyfunctional isocyanate (b) to form a urethanized acrylic or methacrylic monomer (hereinafter referred to as "monomer (A)" for brevity).

In the present invention, this urethanized acrylic or methacrylic monomer (A) is subjected to addition polymerization or is copolymerized with another vinyl monomer having an aromatic ring in the molecule (hereinafter referred to as "monomer (B)" for brevity).

As the vinyl monomer (B) having an aromatic ring in the molecule, there can be mentioned styrene, divinylbenzene, chlorostyrene, dichlorostyrene, bromostyrene, dibromostyrene, iodostyrene, phenyl acrylate, phenyl methacrylate, monochlorophenyl acrylate, monochlorophenyl methacrylate, dichlorophenyl acrylate, dichlorophenyl methacrylate, trichlorophenyl acrylate, trichlorophenyl methacrylate, monobromophenyl acrylate, monobromophenyl methacrylate, dibromophenyl acrylate, dibromophenyl methacrylate, tribromophenyl acrylate, tribromophenyl methacrylate, pentabromophenyl acrylate, pentabromophenyl methacrylate, monochlorophenoxyethyl acrylate, monochlorophenoxyethyl methacrylate, dichlorophenoxyethyl acrylate, dichlorophenoxyethyl methacrylate, trichlorophenoxyethyl acrylate, trichlorophenoxyethyl methacrylate, monobromophenoxyethyl acrylate, monobromophenoxyethyl methacrylate, dibromophenoxyethyl acrylate, dibromophenoxyethyl methacrylate, tribromophenoxyethyl acrylate, tribromophenoxyethyl methacrylate, pentabromophenoxyethyl acrylate, pentabromophenoxyethyl methacrylate, 2,2-bis (4-methacryloxyethoxy-3,5-dibromophenyl) propane, 2,2-bis(4-acryloxyethoxy-3,5-dibromophenyl)propane, diallyl phthalate, diallyl isophthalate and benzyl acrylate.

Among the foregoing vinyl monomers (B), styrene, chlorostyrene, bromostyrene, dibromostyrene, tribromophenyl methacrylate, tribromophenoxyethyl methacrylate and divinylbenzene are preferred.

In the present invention, it is preferred that a vinyl monomer (B) having an aromatic ring, which gives a homopolymer having a refractive index of at least 1.55, be used. A vinyl monomer (B) having a nucleus-halogen-substituted aromatic ring is especially preferred.

The copolymerization ratio of the vinyl monomer (B) having an aromatic ring to the urethanized acrylic or methacrylic monomer (A) and (B). If the copolymerization ratio of the monomer (B) exceeds 70% by weight, the intended improvement of the impact resistance cannot be attained. and the flexural strength, heat softening property and cutting or grinding property are degraded.

In the present invention, up to 20% by weight of another polymerizable monomer may be copolymerized in addition to the monomers (A) and (B), or up to 20% by weight of another polymer may be blended.

A process for making a plastic lens from the above-mentioned plastic lens resin of the present invention will now be described.

The cast polymerization process is adopted for the preparation of a plastic lens. The cast polymerization process is characterized in that the starting monomers are directly polymerized and cured and simultaneously molded into the form of a lens. Accordingly, the molding distortion is reduced and the obtained lens is excellent in optical uniformity. Therefore, most of the commercially available dioptral lenses are now prepared according to this process.

The monomers (A) and (B) are mixed together, and a customary polymerization initiator is added to the mixture to preliminarily advance the reaction to some extent (pre-polymerization). Dissolved gases such as air are removed in vacuo and the pre-polymerization product is cast in a mold, where polymerization is carried out under heating.

In order to reduce the distortion in the resulting lens, it is preferred that in the initial stage, the polymerization reaction be carried out at a relatively low temperature, for example, 40 to 50° C. and with advance of the reaction, the temperature be elevated to about 110° C. to gradually effect addition polymerization.

Any known polymerization initiators can be used, but an appropriate polymerization initiator should be selected depending upon the intended reaction temperature. For example, there are preferably used 1,1-azobiscyclohexane carbonate, diisopropylperoxy carbonate, 1,1'-azobiscyclohexane nitrate and di-tertbutyl peroxide.

The plastic lens composed of the resin of the present invention is characteristic relative to commercially available plastic lenses in the following points.

(1) The refractive index and toughness are high.
(2) The impact strength is improved.
(3) The percent shrinkage at the polymerization molding step is relatively low.
(4) The acrylic or methacrylic monomer and the isocyanate compound can appropriately be chosen, whereby the optical characteristics can freely be adjusted.
(5) The flexural modulus of elasticity is improved.

The plastic lens composed of the resin of the present invention may be subjected to a known physical or chemical surface treatment for imparting the reflection-preventing property, high hardness, abrasion resistance, chemical resistance and anti-fogging property to the lens. For example, there may preferably be adopted a method in which two coatings of different refractive indexes are formed to attain a reflection-preventing effect, a method in which a coating layer having a high hardness is formed on the surface by coating with a polysiloxane or silica sol, a method in which a surface coating is dyed to improve the fashion characteristic, a method in which a metal film is formed on the surface by vacuum deposition or the like to impart a mirror effect, and a method in which a moisture-absorbing coating is formed on the surface to prevent fogging.

An appropriate additive selected from a parting agent, an ultraviolet absorber, an antioxidant, a discoloration-preventing agent, an antistatic agent, a fluorescent dye and a stabilizer may be used at the polymerization step according to need.

The present invention will now be described in detail with reference to examples and corresponding comparative examples. From the results of these examples and comparative examples, it will readily be understood that if a specific urethanized polyfunctional acrylate or methacrylate having a nucleus-halogen-substituted aromatic ring is used according to the present invention, the refractive index, rigidity and impact resistance are highly improved. Of course, these examples by no means limit the scope of the invention.

In the examples and comparative examples, the physical properties were determined according to the following test methods.

Refractive Index and Abbe Number:

The measurement was carried out at 20° C. by using an Abbe refractometer. The wavelength used for the measurement was of the D-ray at 5892.9 Å.

Color:

The color of a plate or molded lens was observed with the naked eye.

Impact Strength:

The impact strength was measured by a Dynstat tester. Test pieces had a thickness of 2.7 to 3.0 mm and a width of 10 mm.

Rigidity:

The rigidity was determined according to the method of ASTM D747. Test pieces had a size of 30 mm x 10 mm x 3 mm.

Flexural Property:

The flexural property was determined according to the method of ASTM D770. Test pieces had a size of 80 mm x 10 mm x 3 mm.

Cutting and Grinding Properties:

A sample lens was compared with a lens obtained in Comparative Example 2 with respect to the cutting and grinding properties.

Example 1

0.01 part by weight of dibutyltin dilaurate as an NCO-OH reaction catalyst and 0.1 part by weight of di-tert-butyl peroxide as a polymerization initiator were added to 18.0 parts by weight of xylylene diisocyanate and 82.0 parts by weight of 3-(2,4-dibromophenoxy)-2-hydroxypropyl acrylate, and the mixture was sufficiently stirred.

The liquid mixture was cast in a mold constructed by a glass sheet having a diameter of 100 mm and a polyethylene gasket while the liquid mixture was heated at 40° to 50° C. The cast polymerization was carried out in the following manner.

Namely, the mixture was heated at 60° C. for 5 hours to complete the NCO/OH reaction, and subsequently, the temperature was elevated to 80° C. and then, the temperature was elevated stepwise from 80° to 120° C. Thus, the polymerization was conducted over a period of 30 hours.

After completion of the polymerization, the mold was gradually cooled, and the polymer was parted from the mold. The physical properties of the polymer were measured to obtain the results shown in Table 1. The obtained resin was tough, colorless and transparent, and the refractive index $n_D$ was as high as 1.61 and the Abbe number was 34.

EXAMPLE 2

0.001 part by weight of dibutyltin dilaurate as an NCO-OH reaction catalyst and 0.1 part by weight of di-tert-butyl peroxide were added to 11.5 parts by weight of 2-isocyanatoethyl-2,6-diisocyanatohexanoate and 88.5 parts by weight of 2-(4-acryloxyethoxy-3,5-dibromophenyl)-2-(4-hydroxyethoxy-3,5-dibromophenyl)propane, and the mixture was sufficiently stirred. Since the liquid mixture had a high viscosity and it was difficult to form a homogeneous mixture, the mixture was diluted with dimethylformamide as a solvent to form a homogeneous composition, followed by complete removal of the solvent.

The liquid mixture was heated to 50° C. to reduce the viscosity, and the mixture was cast in a mold constructed by a glass sheet having a diameter of 100 mm and a polyethylene gasket. The cast polymerization was carried out in the following manner.

Namely, the mixture was heated at 60° C. for 5 hours to complete the NCO/OH reaction, and subsequently, the temperature was elevated to 80° C. and the temperature was elevated stepwise from 80° C. to 120° C. Thus, the polymerization was conducted over a period of 30 hours.

After completion of the polymerization, the mold was gradually cooled and the polymer was parted from the mold, and the physical properties of the polymer were measured to obtain the results shown in Table 1. The obtained resin was tough colorless and transparent, and the refractive index $n_D$ was as high as 1.61 and the Abbe number was 34.

EXAMPLE 3

To a mixture of 10 parts by weight of xylylene diisocyanate, 50 parts by weight of 3-(2,4-dibromophenoxy)-2-hydroxypropyl acrylate and 40 parts by weight of divinylbenzene was added dibutyltin dilaurate as a reaction catalyst in an amount of 100 ppm based on the mixture, and the mixture was heated at 50° C. for 2 hours. Then, the mixture was cooled to room temperature and 0.3% by weight of diisopropyl peroxydicarbonate was added as a radical polymerization initiator. The obtained liquid mixture had a low viscosity and could easily be cast in a lens mold. The liquid was heated at 30° C. for 20 hours, at 40° C. for 3 hours, at 50° C. for 3 hours, at 60° C. for 3 hours, at 80° C. for 3 hours and at 100° C. for 2 hours to effect curing reaction. The obtained resin was tough, colorless and transparent and was excellent in uniformity. The refractive index $n_D$ as measured at 20° C. was as high as 1.61 and the Abbe number was 31.

The percent shrinkage of the resin at the polymerization step was about 7%.

EXAMPLE 4

A mixture comprising 14.9 parts by weight of hexamethylene diisocyanate, 45.1 parts by weight of 3-(2,4,6-tribromophenoxy)-2-hydroxypropyl acrylate, 20 parts by weight of styrene, 20 parts by weight of divinylbenzene and 0.01 part by weight of dibutyltin dilaurate was heated at 50° C. for 2 hours to conduct the reaction. The reaction mixture was cooled to room temperature and 0.3 part by weight of azobisisobutyronitrile as a polymerization initiator was added.

The resulting liquid having a low viscosity was cast in a lens mold and heated at 50° C. for 10 hours, at 60° C. for 10 hours, at 70° C. for 5 hours, at 80° C. for 3 hours at 100° C. for 2 hours to effect the curing reaction.

The obtained molded resin was colorless and transparent and excellent in uniformity, and the resin was hard and tough. The refractive index $n_D$ of the resin was measured at 20° C. was as high as 1.63 and the Abbe number was 32. The percent shrinkage of the polymer at the polymerization step was about 7%.

EXAMPLE 5

A mixture comprising 10 parts by weight of xylylene diisocyanate, 40 parts by weight of 3-(2,4-dibromo-3-methylphenoxy)-2-hydroxypropyl acrylate, 50 parts by weight of chlorostyrene and 0.01 part by weight of dibutyltin dilaurate was heated at 50° C. for 3 hours. Then, the reaction mixture was cooled to room temperature, and a polymerization initiator comprising 0.1 part by weight of diisopropyl peroxydicarbonate and 0.2 part by weight of di-t-butyl peroxide was added. The obtained liquid mixture had a low viscosity and could easily be cast in a lens mold. The temperature was gradually elevated from 30° C. to 120° C. over a period of 3 hours to effect the polymerization reaction.

The obtained molded article was colorless, transparent and tough, and the refractive index $n_D$ as determined at 20° C. was 160 and the Abbe number was 35.

The percent shrinkage of the resin at the polymerization step was about 7%.

EXAMPLE 6

A mixture comprising 10 parts by weight of bis-(isocyanatomethyl)cyclohexane, 24 parts by weight of 3-(2,4,6-tribromo-3-methylphenoxy)-2-hydroxypropyl acrylate, 16 parts by weight of 3-(3-methyl-5-bromophenoxy)-2-hydroxypropyl acrylate, 25 parts by weight of divinylbenzene, 25 parts by weight of tribromophenyl methacrylate and 0.01 part by weight of dibutyltin dilaurate was heated at 50° C. for 3 hours to effect the reaction. The reaction mixture was cooled to room temperature and 0.2 part by weight of di-tert-butyl peroxide was added thereto. The resulting liquid was cast in a lens mold and the temperature was gradually elevated from 70° C. to 120° C. over a period of 30 hours to effect the curing reaction. The percent shrinkage during the polymerization was about 7%.

The obtained resin was colorless, transparent, hard and excellent in uniformity. The refractive index $n_D$ as determined at 20° C. was as high as 1.62 and the Abbe number was 32.

EXAMPLES 7 AND 8

Lenses were made in the same manner as described in Example 1 except that the compositions of the starting monomers were varied as indicated in Table 1. The obtained results are shown in Table 1. It is seen that the obtained resins had a high refractive index and were excellent in mechanical properties such as impact resistance.

COMPARATIVE EXAMPLE 1

A mixture comprising 30 parts by weight of diallyl phthalate, 20 parts by weight of 2-hydroxyethyl acrylate and 19 parts by weight of bisphenol A was heated at 50° C. to form a homogeneous solution. Then, 31 parts by weight of xylylene diisocyanate was added to the solution, and the mixture was heated at 50° C. for 3 hours. Then, the reaction mixture was cooled to room temperature, and 0.5 part by weight of di-tert-butyl peroxide was added as a polymerization initiator. The thus-prepared solution was cast in a lens mold where the solution was heated at 70° C. for 2 hours, at 100° C. for 3 hours and at 130° C. for 10 hours to effect the curing reaction. The percent shrinkage during the polymerization was about 10%.

The obtained molded resin was colorless, transparent, hard and tough. The refractive index $n_D$ as measured at 20° C. was 1.58 and not so high, but the Abbe number was 36.

COMPARATIVE EXAMPLE 2

A solution formed by adding 3 parts by weight of diisopropyl peroxydicarbonate as a polymerization initiator to 100 parts by weight of diethylene glycol biasallylcarbonate was cast in a lens mold, where the solution was heated at 30° C. for 10 hours, at 40° C. for 2 hours, at 50° C. for 2 hours, at 60° C. for 4 hours, at 80° C. for 2 hours and at 90° C. for 2 hours. Then, the gasket was removed and the heating was further conducted at 100° C. for 2 hours to effect the curing reaction. The percent shrinkage of the resin during the polymerization was about 13%.

The obtained molded resin was colorless, transparent, hard and tough. The refractive index $n_D$ as measured at 20° C. was 1.50 and the Abbe number was 58.

The results obtained in the foregoing Examples and Comparative Examples are summarized in Table 1.

TABLE 1

| | Monomer Composition (% by weight) | Refractive Index $n_D$ | Abbe Number D | Color | Impact Strength (kg/cm$^2$) | Rigidity kg/cm$^2$ | Flexural Property (mm) | Cutting and Grinding Properties |
|---|---|---|---|---|---|---|---|---|
| Example 1 | XDI—Br$_2$PHPA (18–82) | 1.61 | 34 | Colorless, transparent | 9.5 | 440 | 6.0 | Good |
| Example 2 | LTI—AEBr$_2$HEBr$_2$PP (11.5–88.5) | 1.61 | 34 | Colorless, transparent | 10.2 | 430 | 6.2 | Good |
| Example 3 | XDI—Br$_2$PHPA/DVB (10–50/40) | 1.61 | 31 | Colorless, transparent | 8.0 | 502 | 3.5 | Good |
| Example 4 | HMDI—Br$_3$PHPA/ST/DVB (10–50/20/20) | 1.63 | 32 | Colorless, transparent | 8.5 | 460 | 3.7 | Good |
| Example 5 | XDI—Br$_2$MPHPA/ClST (10–40/50) | 1.60 | 35 | Colorless, transparent | 8.0 | 501 | 3.3 | Good |
| Example 6 | H$_{12}$MDI—Br$_3$MPHPA/MBrPHPA/DVB/Br$_3$PMA (10–24/16/25/25) | 1.62 | 32 | Colorless, transparent | 9.1 | 483 | 3.8 | Good |
| Example 7 | HMDI—AEBr$_2$HBr$_2$PP/ClST (5.7–44.3/50) | 1.61 | 33 | Colorless, transparent | 9.5 | 453 | 4.0 | Good |
| Example 8 | LTI—AEBr$_2$HEBr$_2$PP/BrST (5.8–44.2/50) | 1.62 | 32 | Colorless transparent | 9.7 | 450 | 4.1 | Good |
| Comparative Example 1 | XDI—HEMA—BPA/DAP (70/30) | 1.58 | 36 | Colorless transparent | 6.0 | 390 | 3.5 | Good |
| Comparative Example 2 | DEGBAC (100) | 1.50 | 58 | Colorless transparent | 4.5 | 240 | 6.5 | Good |

The abbreviations in Table 1 indicate the following compounds.

| | |
|---|---|
| LTI: | 2-isocyanatoethyl-2,6-diisocyanatohexanoate |
| XDI: | xylylene diisocyanate |
| HMDI: | hexamethylene diisocyanate |
| H$_{12}$MDI: | 4,4'-dicyclohexylmethane diisocyanate |
| Br$_2$PHPA: | 3-(2,4-dibromophenoxy)-2-hydroxypropyl acrylate |
| AEBr$_2$HEBr$_2$PP: | 2-(4-acryloxyethoxy-3,5-dibromophenyl)-2-(4-hydroxyethoxy-3,5-dibromophenyl)propane |
| Br$_3$PHPA: | 3-(2,4,6-tribromophenoxy)-2-hydroxypropyl acrylate |
| Br$_2$MPHPA: | 3-(2,4-dibromo-3-methylphenoxy)-2-hydroxypropyl acrylate |
| Br$_3$MPHPA: | 3-(2,4,6-tribromo-3-methylphenoxy)-2-hydroxypropyl acrylate |
| MBrPHPA: | 3-(3-methyl-5-bromophenoxy)-2-hydroxypropyl acrylate |
| AEBr$_2$HBr$_2$PP: | 2-(4-acryloxyethoxy-3,5-dibromophenyl)-2-(4-hydroxy-3,5-dibromophenyl)propane |
| DVB: | divinylbenzene |
| ST: | styrene |
| ClST: | chlorostyrene (o-isomer/p-isomer weight ratio = 65/35) |
| BrST: | bromostyrene |
| HEMA: | 2-hydroxyethyl acrylate |
| DAP: | diallyl phthalate |
| BPA: | bisphenol A |
| DEGBAC: | diethylene glycol bisallylcarbonate |

What is claimed is:

1. A resin material for a plastic lens, having a refractive index of at least 1.58 and comprising a homopolymer formed by polymerizing a urethanized acrylic or methacrylic monomer or a copolymer formed by copolymerizing a urethanized acrylic or methacrylic monomer with another vinyl monomer having an aromatic ring, said urethanized acrylic or methacrylic monomer being a product of a reaction of a hydroxyl group of an acrylic or methacrylic monomer having a nucleus-halogen-substituted aromatic ring with an isocyanate group of a polyfunctional isocyanate, said acrylic or methacrylic monomer having a nucleus-halogen-substituted aromatic ring and a hydroxyl group in the molecule being at least one member selected from the group consisting of compounds, represented by the following general formulae (I), (II) and (III):

$$X_n\text{-}\underset{R^1}{\text{C}_6\text{H}_3}\text{-}O\text{-}CH_2\text{-}CH(OH)\text{-}CH_2\text{-}O\text{-}\underset{O}{\overset{\parallel}{C}}\text{-}\underset{R_1}{C}=CH_2 \quad (I)$$

$$X_n\text{-}\underset{R_1}{\text{C}_6\text{H}_3}\text{-}O\text{-}CH_2\text{-}CH(CH_2OH)\text{-}O\text{-}\underset{O}{\overset{\parallel}{C}}\text{-}\underset{R_1}{C}=CH_2 \quad \text{and} \quad (II)$$

$$H\text{-}(OHC\text{-}CH_2)_l\text{-}O\text{-}\underset{X_n}{\text{C}_6\text{H}_3}\text{-}\underset{CH_3}{\overset{CH_3}{C}}\text{-}\underset{X_n}{\text{C}_6\text{H}_3}\text{-}O\text{-}(CH_2CH(R_2)\text{-}O)_m\text{-}\underset{O}{\overset{\parallel}{C}}\text{-}\underset{R_1}{C}=CH_2 \quad (III)$$

wherein X is chlorine, bromine or iodine, each of $R_1$ and $R_2$ is hydrogen or a methyl group, n is an integer of from 1 to 4, and l and m are integers of from 0 to 4, with the proviso that the sum of l and m is from 0 to 4, and the amount of the vinyl monomer having an aromatic ring to be copolymerized with the urethanized acrylic or methacrylic monomer being up to 70% by weight based on the total weight of the monomers.

2. A plastic lens, having a refractive index of at least 1.58 and comprising a homopolymer formed by cast-polymerizing a urethanized acrylic or methacrylic monomer or a copolymer formed by copolymerizing a urethanized acrylic or methacrylic monomer with another vinyl monomer having an aromatic ring, said urethanized acrylic or methacrylic monomer being a product of a reaction of a hydroxyl group of an acrylic or methacrylic monomer having a nucleus-halogen-substituted aromatic ring with an isocyanate group of a polyfunctional isocyanate, said acrylic or methacrylic monomer having a nucleus-halogen-substituted aromatic ring and a hydroxyl group in the molecule being at least one member selected from the group consisting of compounds represented by the following general formulae (I), (II) and (III):

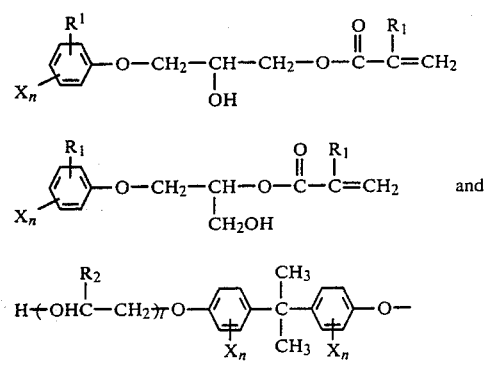

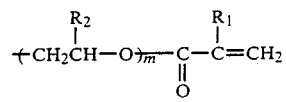

wherein X is chlorine, bromine or iodine, each of $R_1$ and $R_2$ is hydrogen or a methyl group, n is an integer of from 1 to 4, and l and m are integers of from 0 to 4, with the proviso that the sum of l and m is from 0 to 4, and the amount of the vinyl monomer having an aromatic ring to be copolymerized with the urethanized acrylic or methacrylic monomer being up to 70% by weight based on the total weight of the monomers.

3. A resin material for a plastic lens according to claim 1, wherein said other vinyl monomer having an aromatic ring has a nucleus-halogen-substituted aromatic ring.

4. A resin material for a plastic lens according to claim 3, wherein the halogen is at least one member selected from the group consisting of chlorine, bromine and iodine.

5. A resin material for a plastic lens according to claim 1, wherein said other vinyl monomer having an aromatic ring gives a polymer having a refractive index of at least 1.55 when said other vinyl monomer is homopolymerized.

6. A resin material for a plastic lens according to claim 1, wherein the polyfunctional isocyanate is a diisocyanate.

7. A resin material for a plastic lens according to claim 1, which has a refractive index of at least 1.60.

* * * * *